United States Patent [19]

McCaslin

[11] 4,097,917
[45] Jun. 27, 1978

[54] ROTATABLE LIGHT DISPLAY

[76] Inventor: Robert E. McCaslin, 81 Anchor Dr., Pittsburg, Calif. 94565

[21] Appl. No.: 693,384

[22] Filed: Jun. 7, 1976

[51] Int. Cl.² ............................ F21V 7/04; F21V 21/30
[52] U.S. Cl. ........................................ 362/32; 84/464; 362/35; 362/84; 362/234; 362/800; 362/811
[58] Field of Search .................. 240/1 LP, 2 L, 10 R, 240/10 L, 10 P, 10.1; 84/464; 362/32, 35, 84, 122, 227, 234, 253, 276, 800, 811

[56] References Cited

U.S. PATENT DOCUMENTS

| 1,718,499 | 6/1929 | Thomas | 84/464 |
| 2,485,460 | 10/1949 | Rocco | 240/10.1 X |
| 3,247,750 | 4/1966 | Sklar | 84/464 |
| 3,431,410 | 3/1969 | Dolan et al. | 240/10.1 |
| 3,617,732 | 11/1971 | Fisher | 240/10.1 X |
| 3,681,589 | 8/1972 | Roberts | 240/10 R X |

FOREIGN PATENT DOCUMENTS 1,395,344   5/1975   United Kingdom ............... 240/10 L Primary Examiner—Fred L. Braun
Attorney, Agent, or Firm—Townsend and Townsend

[57] ABSTRACT

A light display which rotates in response to command signals in the form of sounds, light beams or the like. The display includes a tube having flexible rod-like members coupled thereto and extending outwardly therefrom with the outer ends of the members being provided with essentially point sources of light which, when the tube rotates, trace out generally continuous lines due to the relativey high speed of rotation of the tube. The tube rotates under the influence of an electric motor which receives command signals for causing rotation of the drive shaft thereof. The drive shaft is either connected directly or by gear-down structure to the tube. One embodiment of the invention utilizes the rod-like members which are flexible glass fibers and a light source is disposed to the outer ends thereof. In another embodiment, the members are tubes having light emitters such as light diodes at their outer ends.

13 Claims, 3 Drawing Figures

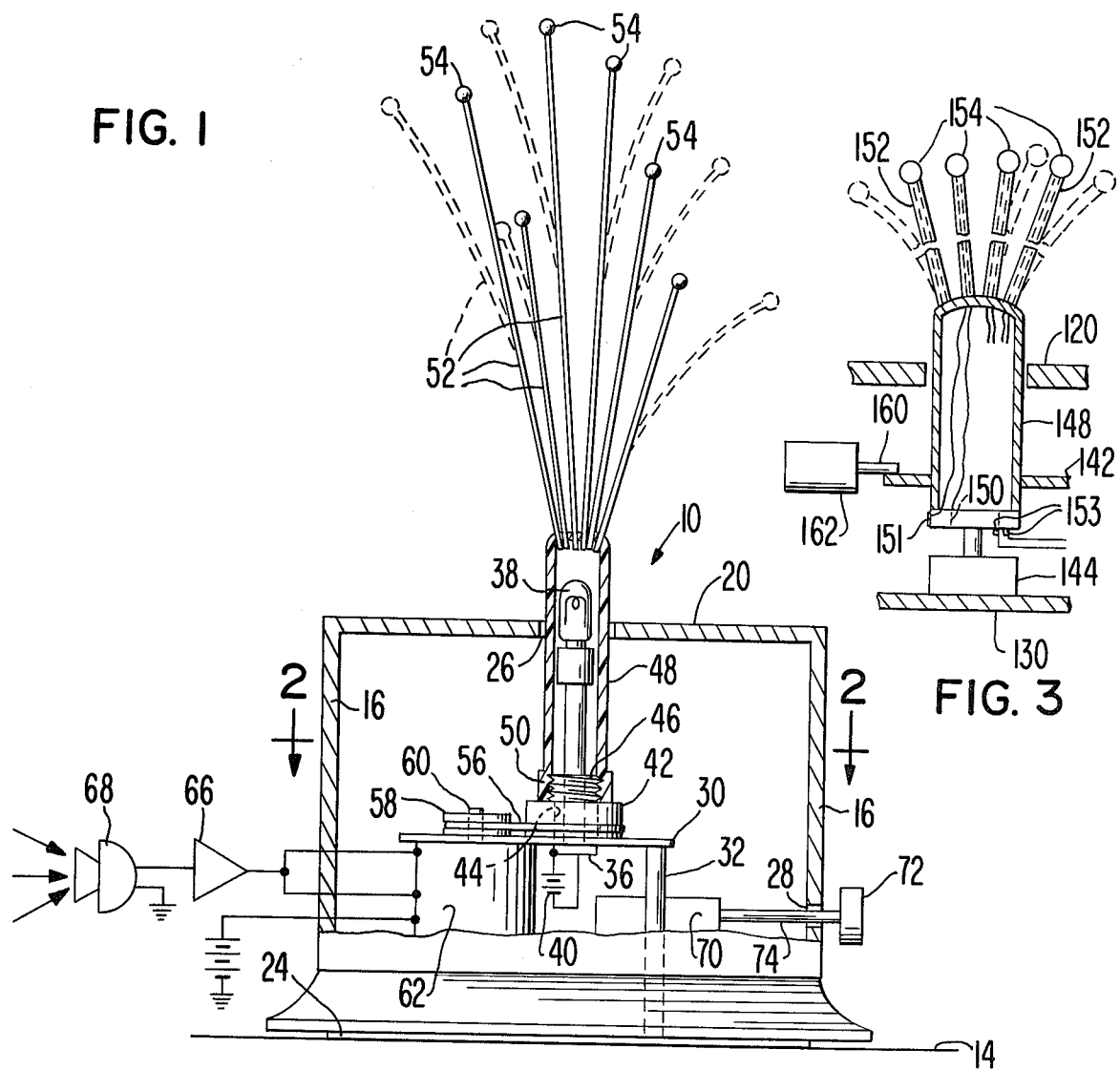
FIG. 1
FIG. 3
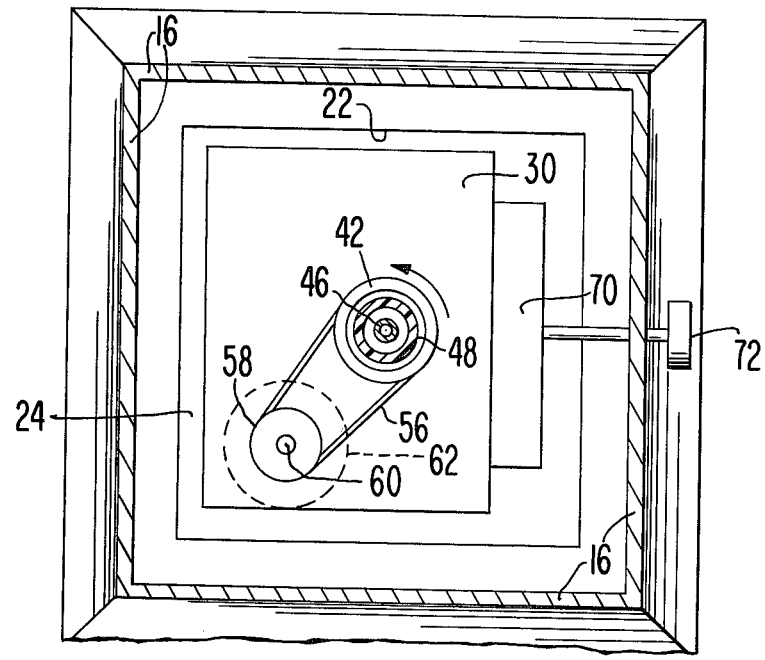
FIG. 2

ROTATABLE LIGHT DISPLAY

BACKGROUND OF THE INVENTION

Light displays using glass fiber rods have previously been used to provide aesthetic effects. One type of such display is stationary and another type rotates very slowly, such as with a synchronous motor, at one speed. None of the conventional light displays using glass fibers operates to provide an artistic effect derived by rotating the glass fibers or other such structures continuously and randomly at different speeds in accordance with external commands directed to the rotating means of the display. In fact, the flexibility of glass fiber rods has not been relied upon to provide the aesthetic effects which are possible by rotating the rods and causing them to flex and move continuously due to continuously changing centrifugal forces exerted on them. A need has, therefore, arisen for an improved light display which utilizes the flexibility of glass rods and other types of structures to provide rotating pinpoint light sources which move along continuously changing paths in accordance with external commands, such as music, the human voice, and the like, whereby the light display can provide an aesthetic effect not attainable with conventional light displays.

SUMMARY OF THE INVENTION

The present invention meets the aforesaid need by providing a rotatable light display comprised of a plurality of flexible, elongated members having, in effect, pinpoint light sources at the outer ends of the members. Means is provided for continuously rotating the members as they extend outwardly and away from a support so that, as the members rotate, they flex outwardly due to the centrifugal forces exerted thereon and, depending upon the speed of rotation of the members, they will flex to a greater or lesser degree. As the outer ends of the members rotate the greater or lesser speeds, they present continuously changing patterns of continuous lines of light which can be of different colors so as to provide a pleasing, aesthetic effect and one which provides entertainment for those viewing the display in operation.

The display of this invention utilizes a drive means having a sensor for sensing external commands, such as sounds, light beams or the like. The sensor converts the commands to electronic signals which, when applied to the drive means, causes rotation of the members and the resulting light displays in the form of continuous lines. As the signals vary in amplitude, the speed of rotation of the members also vary so they flex to a greater or lesser degree and thereby provide the changing light patterns in the form of the aforesaid continuous lines.

In one form of the invention, the members are comprised of glass fibers which extend into and through one end of a tube mounted for rotation on a support. A light source in the tube directs its light beams onto the inner faces of the glass fibers and the light is transferred to the outer ends thereof, on which are blobs of colored fluorescent materials so that, when light strikes each blob, it fluoresces and provides, in essence, a pinpoint light source.

Another embodiment of the invention utilizes long, slender tubes having light emitters at their outer ends thereof, such light emitters being light emitting diodes or the like. Electrical leads from the light emitters extend along the length of respective tubes and are coupled to brushes and contact rings to connect the light emitters with a source of electrical current, such as a battery.

The primary object of this invention is to provide an improved light display which utilizes a plurality of flexible, elongated members which present point sources of light at respective ends thereof and which rotate in response to external commands so that their outer ends present continuous lines of light which are constantly changing due to variations in the commands.

Another object of this invention is to provide a light display of the type described wherein the members are coupled to and project outwardly from a rotating element connected to a drive motor having a sensor which picks up external commands, such as music, the human voice, light signals or the like, and the commands, when they vary in amplitude, cause variations in the drive speed of the motor so that the rotatable members will flex to a greater or lesser degree due to centrifugal forces exerted thereon and the resulting light patterns will change shapes continuously, corresponding to the characteristics of the command signals, such as the beat of music when music signals provide the commands.

Other objects of this invention will become apparent as the following specification progresses, reference being had to the accompanying drawing for an illustration of several embodiments of the invention.

In the Drawings

FIG. 1 is a side elevational view, partly broken away of one embodiment of the rotatable light display of this invention, parts being broken away and in section to illustrate details of construction;

FIG. 2 is a cross-sectional view taken along line 2—2 of FIG. 1; and

FIG. 3 is a fragmentary view similar to FIG. 1, but showing another embodiment of the rotatable light display.

The first embodiment of the rotatable light display of this invention is broadly denoted by the numeral 10 and includes a housing 12 adapted to be supported on a surface 14. The housing has four sides 16, a bottom 18, and a top 20. Bottom 18 has a central, generally square opening 22 (FIG. 2) which is covered by a base plate 24 releaseably attached by screws or other fasteners to the underside of bottom 18. Top 20 has a central hole 26 therethrough and one side 16 has a hole 28 therethrough.

A support plate 30 is mounted by a number of spacers 32 (only one of which is shown) on base plate 24 so that support plate 30 is intermediate the distance between bottom 18 and top 20 when the support plate 24 is in the operative position thereof shown in FIG. 1. Support plate 30 has a fixed tubular post 34 mounted thereoon by means of a suitable fastener 36. A light bulb 38 is mounted on the upper end of post 34 and generally projects through hole 26 when base plate 24 is in its operative position. Electrical wires from light bulb 38 pass through post 34 and are connected to a battery or other power source 40 in any suitable manner.

A pulley 42 is mounted by means of a bearing 44 on the lower end of post 34 adjacent to the upper surface of support plate 30. Pulley 44 carries an externally threaded extension 46 for rotation therewith. A tube 48 is provided with a base 50 threaded onto extension 46 for rotation therewith. The tube has a length sufficient to house post 34 and light bulb 38 and it extends a slight distance upwardly therefrom and above top 20. Moreover, the tube has a transverse dimension or diameter sufficient to permit it to extend through hole 26 in top 20, yet the tube can rotate relative to the top. Tube 48, at least in the vicinity of and above light bulb 38 is lighttight in that it has a sidewall which is opaque to light transmission therethrough and has a closed upper end.

A plurality of flexible glass fibers 52 are mounted on the closed end of tube 48 and extend upwardly and away therefrom at different angles as shown in FIG. 1. The lower ends of the fibers extend through the closed upper end of tube 48 so that the ends of the fibers are in light communciation with the interior of the tube, at least in the space between the light bulb 38 and the closed upper end of tube 48. Thus, light emitted from light bulb 38 will strike the lower ends of the glass fibers and be transmitted therethrough to the outer ends thereof. Each glass fiber has a mass or blob 54 of a fluorescent paint which is excited by the light passing through the fiber to give a specific color. The blobs may be of different colors if desired. Also, the lengths of the various glass fibers can differ from each other as shown in FIG. 1.

The glass fibers are mounted on the upper end of tube 48 in any suitable manner. For instance, holes can be drilled in the closed upper end of the tube and the glass fibers inserted into the holes and then adhesively or otherwise bonded to the closed end. In the alternative, the upper end of the tube 48 can initially be open and can be closed with a mass of a suitable thermoplastic material which supports the lower ends of the glass fibers and provide an adhesive bond between the latter and the upper end of the tube.

Tube 48 is rotated by rotating pulley 42 with an endless flexible belt 56 coupled to a second pulley 58 mounted on the drive shaft 60 of an electric motor 62 carried in any suitable manner on support plate 30 below the latter. Pulleys 42 and 58, along with belt 56, provide a gear-down structure so that a relatively high speed motor 62 can be used in rotating tube 48. A motor possibly could be obtained whose speed is the desired speed of rotation of tube 48, such as 1 to 5 or 6 revolutions per second. In such a case, the drive shaft of the motor would be connected directly to tube 48 in any suitable manner.

Motor 62 requires a voltage signal for operation and this signal is the output of an amplifier 66 having microphone 68 coupled to its input, the microphone being adapted for sensing external sounds, such as music, the sound of the human voice and the like. Microphone 68 generates electrical signals from sound signals and applies them to amplifier 66 which then directs the amplified signal to the motor to actuate it and thereby rotate the drive shaft thereof as a function of the signals received from the microphone. A sensitivity control 70 can be coupled to amplifier 66 to change the sensitivity of the circuit as desired. Control 70 is manually operated by a rotatable shaft 74 projecting through hole 28 and having a knob 72 on its outer end.

In use, sound signals received by the microphone are changed into electrical signals which are amplified and applied to the motor, providing the voltage signal thereto. These signals, therefore, cause the motor to be actuated and drive shaft 60 thereof causes rotation of pulley 58 and thereby pulley 42 and tube 48. This occurs while the light bulb 38 is actuated. This generlly is done in a darkened room and, when tube 48 is rotated, centrifugal force casues glass fibers 52 to bend and flex outwardly and downwardly into different operative positions, such as the dashed line positions shown in FIG. 1. These positions vary all the time in accordance with the amplitude of the signals received by the motor whose drive shaft 60 increases and decreases in speed as a function of such amplitude variations. The net result is a pattern of generally continuous colored lines in space due to the excitation of blobs 54 by the light received at the lower ends of the glass fibers and transmitted to the blobs. The light patterns achieved by the rotation of the glass fibers, therefore, provides an aesthetic appearance and one which gives much enjoyment and entertainment to persons viewing the light display.

Another embodiment of the display is shown in FIG. 3 and includes a plurality of flexible tubes 152 of metal or plastic secured at their lower ends to the upper end of a rotatable tube 148 mounted by a suitable bearing 144 on suppport plate 130. Tube 148 projects through the top 120 of a housing similar to housing 12. A disk 142 is secured to tube 148 near the lower end thereof and rotates therewith. A drive motor 162 having a drive shaft 160 is adjacent to the disk and drive shaft 160 is in frictional engagement with the disk near the outer periphery thereof for rotating the disk and thereby tube 148 about the vertical axis of the tube relative to support 130.

Each tube 152 has a light emitter 154, such as a light emitting diode. The electrical leads to each diode 154 extends along the length of its corresponding tube 152 and downwardly to a pair of concentric contact rings 150 and 151 coupled to tube 148 for rotation therewith. A pair of brushes 153 are coupled to respective contact rings 150 and 151 to connect the same to a suitable power source, such as a battery. The signal input to motor 162 is through an amplifier and microphone in the same manner as that described above with respect to the embodiment of FIG. 1.

As tube 148 rotates upon actuation of motor 162, tubes 152 bend for flex downwardly and outwardly into various positions, such as the dashed line position of FIG. 3, similar to the manner described above with respect to the glass fibers of FIG. 1. As this occurs, the light emitters 154 are in operation and, as tube 148 rotates, these light emitters are rotating sufficiently fast to give the visual image of continuous lines. These lines vary continuously in location and the patterns they make change in size and shape because the flexibility of the tubes causes the light emitters to change positions continuously with their changes in the commands sensed by the microphone. The result is a display of lights which may be of different color to provide enjoyment and entertainment in viewing the display and in associating the pattern of the display with the sound input to the microphone.

While a microphone has been described as the sensor for receiving an external command signal or stimulus, it is clear that other sensors could be utilized if desired. For instance, a photocell can be used in place of the microphone for receiving light from an external source. The audio output of a receiver which broadcasts or other sounds could also serve as the sensor for the present invention.

In lieu of motor 62, another suitable rotating means can be of the type defined by a motor having an armature provided with a number of fixed solenoids surrounding the same, wherein the solenoids are successively actuated to cause rotation of the armature. Each solenoid operates to rotate the armature through a certain arc similar to the operation of a stepping motor.

The input to the solenoids includes a series of AND gates which drive the solenoids under the influence of a frequency selective RC network whose input would be a microphone. Thus, the motor would be operated as a function of frequency rather than sound level. Thus, the sound from one musical instrument, for instance, would cause rotation of members in a manner different from the sound from another instrument of a different kind or which produces signals of different frequencies from those of the first instrument.

I claim:

1. A rotatable light display comprising: a support; a plurality of elongated, flexible members; means carried by the support and rotatable relative thereto for rotatably mounting said members thereon with the members extending outwardly from the support in directions generally longitudinally of the axis of rotation of said mounting means; means coupled with said members for defining light sources at their outer ends; a motor having a rotatable drive shaft; means connecting the drive shaft to said mounting means for rotating said members relative to the support when the motor is energized; and means responsive to acoustic signals and coupled to said motor for applying electronic signals thereto to energize the same.

2. A display as set forth in claim 1, wherein said applying means comprises a microphone.

3. A display as set forth in claim 1, wherein said members comprise glass fibers.

4. A display as set forth in claim 3, wherein each glass fiber has a layer of fluorescent material at the outer end thereof, the layers defining the light sources for respective glass fibers when the layers are excited by light energy, and a fixed light emitting element adjacent to the ends of the fibers proximal to the support for supplying light energy for transmission through the glass fibers to said layers.

5. A display as set forth in claim 1, wherein the light sources are light emitting diodes, each light emitting diode having electrical conductor means extending along the corresponding member for connection to an electrical power source adjacent to the support.

6. A display as set forth in claim 5, wherein each member comprises a tube, and including contact ring means for coupling the conductor means to said power source.

7. A display as set forth in claim 1, wherein said mounting means comprises a tube having a pair of opposed ends, one end of the tube being mounted for axial rotation on the support; said members extending outwardly from the opposite end of the tube.

8. A display as set forth in claim 7, wherein the tube is mounted for rotation about a generally vertical axis.

9. A display as set forth in claim 7, wherein the members comprise glass fibers extending through said outer end and communicating with the interior of the tube, there being a light source within the tube for directing light onto the inner faces of the glass fibers for transmission therethrough.

10. A display as set forth in claim 7, wherein the tube has a pair of concentric slip rings near one end thereof, said light sources being light emitters at the outer ends of said members, each light emitter having conductor means coupled with said rings, and brush means coupled to the slip rings for connecting the same to a source of electrical power.

11. A display as set forth in claim 10, wherein there is a disk secured to said tube, and said drive shaft is in engagement with the disk near its outer periphery for rotating the disk and thereby said tube relative to the support.

12. A display as set forth in claim 7, wherein the support is disposed within a housing having a wall provided with an opening therethrough, said tube extending through the opening, said members being externally of the housing.

13. A rotatable light display comprising: a housing having a top provided with a hole therethrough; a support plate within the housing below said hole; a tube rotatably mounted on the support plate and extending through the hole; a plurality of elongated, flexible optical glass fibers secured to the upper end of the tube and projecting outwardly therefrom, each fiber having a mass of fluorescent material on the outer end thereof, the inner ends of the fibers being in light communication with the interior of the tube; a light source; means mounting the light source on said support plate with the light source within the tube; a motor within said housing, said motor having a drive shaft; means coupling the drive shaft to said tube for rotating the latter relative to the support when said motor is energized; a microphone carried by said housing and responsive to acoustic signals for providing electronic signals corresponding to said acoustic signals, said microphone being coupled with said motor for energizing the same with said electronic signals.

* * * * *